Nov. 10, 1936. A. G. STEINMAYER Re. 20,168
FUSE
Original Filed Sept. 16, 1929
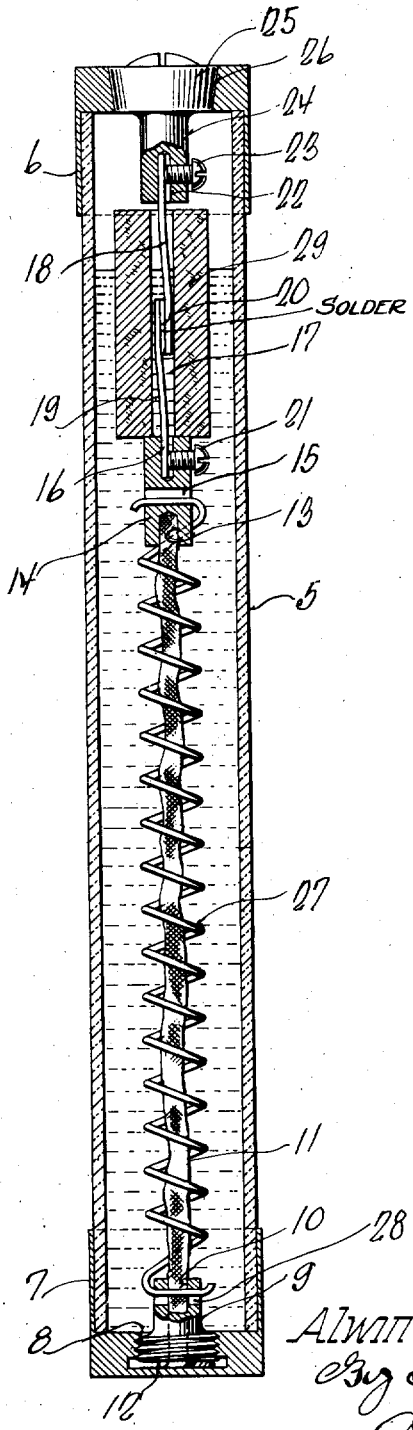
Inventor
Alwin G. Steinmayer
By Ira Milton Jones
Attorney Reissued Nov. 10, 1936 Re. 20,168

UNITED STATES PATENT OFFICE 20,168

FUSE

Alwin G. Steinmayer, Milwaukee, Wis., assignor to Line Material Company, South Milwaukee, Wis., a corporation of Delaware Original No. 1,932,194, dated October 24, 1933, Serial No. 393,038, September 16, 1929. Application for reissue March 4, 1935, Serial No. 9,271

5 Claims. (Cl. 200—117)

This invention relates to certain new and useful improvements in fuses and refers more particularly to a fuse for use with high tension circuits and particularly adapted for low amperages.

Heretofore, fuses of this type have been formed of a single piece of fusible metal, maintained under tension by a spring, so that upon rupture of the fuse, the released energy of the spring would quickly draw one of the fuse element terminals out of its operative position to increase the gap between the terminals. This construction, however, was objectionable when used with lower amperages as the fusible element, in such instances, is necessarily light and consequently so mechanically weak that it could not stand the strain of the continuous tension applied by the spring. It is, therefore, one of the objects of this invention to provide a fuse of the character described which will rupture at the desired low amperage and which has sufficient mechanical strength to withstand a continuous tension thereon.

Another object of this invention resides in providing a fuse of the character described which may be re-fused in the field.

Another object of this invention resides in the provision of an improved method of venting accumulated gases upon rupture of the fuse.

And a more specific object of this invention resides in the provision of a fuse of the character described having a pair of fuse elements soldered together for a portion of their length whereby sufficient mechanical strength is obtained to withstand the tension to which the fuse is subjected without increasing its current carrying capacity.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing, I have illustrated one complete example of the physical embodiment of my invention constructed according to the best mode I have so far devised for the practical application of the principles thereof, and in which:

The single figure is a transverse sectional view taken through a fuse embodying my invention.

Referring now more particularly to the accompanying drawing the numeral 5 represents the tube or cartridge of the fuse which is preferably formed of glass or similar material and to the ends of which contacts 6 and 7 are secured in any suitable manner. The contact 7 is provided with an axial threaded recess 8 communicating with the interior of the tube to receive a longitudinally bored nut member 9. One end of a flexible conductor cable 11, is passed through the bore 10 of the nut member to be folded upon itself as at 12 and impinged between the bottom of the recess and the lower face of the nut member to provide a good electrical connection between the contact and the flexible conductor.

The flexible conductor 11 electrically connects the contact 7 with one end of a fuse element indicated generally as at 17 by having its free end soldered or otherwise secured in an aperture 13 formed in a fuse terminal 14 having a transverse opening 15 and a bored recess 16 projecting downwardly from its upper end to receive the said end of the fuse element. The fuse element 17 consists of two similar sections 18 and 19 formed of comparatively heavy wire of the same or different materials, depending upon the amperage at which the fuse is to be ruptured, and having their adjacent ends soldered together as at 20. The solder used may be either a pure tin or a special alloy, the pure tin however being preferable as it has greater mechanical strength. The wires of which the sections 18 and 19 are formed, may be of any suitable metal as for instance, nickel-silver, which has exceptionally high mechanical strength and sufficient resistance to the passage of electric current to heat and melt the solder at the predetermined overload.

The free end of the fuse element section 19 which is received in the bored recess 16 of the terminal member 14, is secured therein by a set screw 21 and the free end of the section 18 is similarly secured, by a set screw 23, in a bored aperture 22, formed in a downwardly projecting boss 24 of a cap 25. The cap 25 is preferably in the shape of an inverted truncated cone and is received in a correspondingly tapered bore 26 in the contact 6 to thus electrically connect the adjacent end of the fuse element with the contact 6 whereby the contacts 6 and 7 are bridged through the fuse element and the flexible conductor 11.

To maintain the cap 25 seated in its bore 26 and to insure the immediate provision of a large gap between the contacts upon melting the solder due to an overload, a contractile spring 27 connects the terminal member 14 with the nut member 9, one end being engaged in the transverse opening 15 of the terminal member 14 and its other end being received in a transverse opening 28 in the nut member.

To confine the arc incidental to the rupture of the fuse to its immediate vicinity the sections 18 and 19 comprising the fuse element are surrounded by a cork sleeve 29 having a longitudinal opening slightly larger than the size of the fuse element, and to further insure quick extinguishment of the arc, the entire tube is preferably filled with a suitable fluid having a high degree of dielectric strength.

In the event of an overload in the circuit including the fuse, the increased current heats the fuse element and melts the solder connecting its sections 18 and 19, permitting the spring 27 to quickly separate the sections and produce a relatively large gap between the contacts. In the event of an extremely large overload, the resulting explosion merely blows the cap 25 from its seat to vent the gases and thus precludes the possibility of demolishing the entire fuse.

From the foregoing disclosure it is obvious that the section 19 of the fuse element comprises a relatively rigid portion extending from the terminal 14 into the bore of the sleeve 29, whereby when the sections 18 and 19 are separated under overload conditions, an arc will be drawn in the bore of the sleeve 29.

The bore of the sleeve 29 is preferably uniform in diameter throughout the length of the sleeve and is relatively smaller than the bore of the cartridge 5, but it is preferably larger than the section 19 in order to permit gases generated by the heat of the arc to expand freely.

It may be clearly seen from the drawing that, since the lower end of the bore in the sleeve 29 is closed by the terminal 14, liquid will be prevented from entering the lower end of the bore. As a result, liquid in the bore will not be replaced by cooler liquid which would tend to cool the fuse element 17 and delay the separation of the sections 18 and 19.

Obviously the sleeve 29 may be composed of insulating material other than cork, the material comprising the sleeve being entirely within the choice of the manufacturer and in conformity with the results desired. Preferably the sleeve 29 should rest on the terminal 14 to substantially close the lower end of the bore in the sleeve. However, even though the sleeve 29 may be forced upwardly by the liquid and into contact with the boss 24, the formation of vapor in the bore of the sleeve may create sufficient pressure upon the liquid in the bore to force the liquid out at the lower end thereof and prevent cooler liquid from entering therein, thus insuring a reasonable degree of accuracy in the point of overload at which the fusible element 17 will separate.

Irrespective of whether the sleeve 29 rests on the terminal 14 or against the boss 24, the effect will be to prevent liquid exteriorly of the sleeve 29 from entering the bore thereof and replacing warmer liquid in the bore when the fusible element 17 is subjected to an overload.

It is also noted that re-fusing in the field is not only possible but practical. Those skilled in the art to which this invention belongs will understand that the flexible conductor 11 should be sufficiently long, to permit the fuse terminal 14 together with the end of the spring connected therewith to be drawn out through the opening 26 in the contact 6, with the aid of a hooked wire inserted through the opening. This facilitates the removal of the remainder of the blown fuse section 19 to permit a new fuse to be attached, and if necessary a new cork sleeve, and additional liquid also may be added.

From the foregoing description taken in connection with the accompanying drawing, it will be readily apparent to those skilled in the art to which this invention appertains, that I provide a novel fuse structure which is particularly adapted for use with low amperages, in which the existing objection to fuses maintained under tension by a spring is eliminated, and in which re-fusing in the field is made practical.

What I claim as my invention is:

1. In an expulsion fuse of the character described, the combination of a tube of insulating material, a metal cap mounted on each end of the tube, the side walls of which are adapted for engagement with terminal clips, the end wall of one cap being imperforate to completely close said end of the tube, while the end wall of the other cap has a tapered bore forming a vent opening, the closed end wall of the first mentioned cap having an internally threaded recess, a plug detachably secured in said recess, said plug having an opening therethrough leading to the bottom of the recess, a flexible conductor having one end passed through said opening to be folded over and clamped between the bottom of the recess and the adjacent end of the plug, a terminal member fixed to the opposite end of the flexible conductor, a second terminal member having an enlarged frustro-conical head seated in said tapered bore in the other cap, a fuse element readily detachably connected at its opposite ends with said terminals to electrically bridge the same, whereby said caps at the ends of the tubes are electrically connected through the fuse element and the flexible conductor, and a tensile spring having one end connected with the plug at the first mentioned cap and its other end engaging the first mentioned terminal to maintain the fuse element in tension.

2. In a liquid fuse comprising a main tube having a pair of contacts and an arc extinguishing liquid in the tube, the combination with conducting means connecting said contacts and disposed in major part in said liquid; said means including a fusible section, a flexible section, a relatively rigid section connecting the fusible section and the flexible section, a spring coaxial with the flexible section, and means connecting the spring with said relatively rigid section; of an arcing sleeve comprising insulating material surrounding and coaxial with the relatively rigid section, the bore of the sleeve being larger in diameter than the relatively rigid section and being substantially uniform in diameter and unobstructed throughout the length of said sleeve, thereby to provide an arcing space surrounding the relatively rigid section for the free expansion of gases produced by an arc when the fusible section is fused, and means on one of said contacts adapted to confine said sleeve in proximity to the means connecting the spring with said relatively rigid section, the first-mentioned means being normally disposed adjacent the lower end of said bore.

3. In a fuse, a main tube having upper and lower terminal contacts, a conductor in said tube connecting said terminal contacts, said conductor comprising a fuse element including a relatively rigid portion, a flexible portion and a movable terminal portion connecting the relatively rigid portion and the flexible portion, in combination with an arcing tube in the main tube surrounding the relatively rigid portion, the bore of said arcing tube being larger in diameter than the cross-sectional width of the relatively rigid portion in said arcing tube, whereby gases may freely expand in said arcing tube without injury thereto, a spring connected to the terminal portion for withdrawing said relatively rigid portion from said arcing tube when said fuse element is ruptured, an anchorage for the other end of said spring disposed on the lower end of the main tube, and means carried by the upper contact adapted to confine said arcing tube in close proximity to the terminal portion, said terminal portion being normally adjacent the lower end of the bore in said arcing tube.

4. In a fuse, a main tube having terminal contacts, a conductor in said tube connecting said terminal contacts, said conductor comprising a fuse element including a relatively rigid portion, a flexible portion and a movable terminal portion connecting the relatively rigid portion and the flexible portion, in combination with an arcing tube in the main tube and having a bore slightly larger than the transverse dimension of the relatively rigid portion, said arcing tube surrounding the relatively rigid portion, spring means connected with said terminal portion for withdrawing said relatively rigid portion from said arcing tube when said fuse element is ruptured, and means on one of said contacts adapted to confine said arcing tube in close proximity to said terminal portion.

5. In a fuse, a conductor comprising a fuse element including a relatively rigid portion, a relatively flexible portion, an arcing tube having a relatively small bore of unvarying dimension from end to end and slightly larger than said relatively rigid portion, the bore in said tube being unobstructed and surrounding the relatively rigid portion, a terminal connected to said relatively rigid portion, and a spring tensioning said fuse element and connected to said terminal, said terminal being disposed adjacent the lower end of said bore, whereby to cause the relatively rigid portion to be projected from the end of the tube when said fusible element is ruptured.

ALWIN G. STEINMAYER.